H. A. HOUSE, Jr.
DETACHABLE WHEEL.
APPLICATION FILED FEB. 10, 1916.

1,363,598.

Patented Dec. 28, 1920.
6 SHEETS—SHEET 2.

WITNESSES:

INVENTOR
Henry A. House Jr.
by his attorney
J. Edward Thebaud.

H. A. HOUSE, Jr.
DETACHABLE WHEEL.
APPLICATION FILED FEB. 10, 1916.

1,363,598.

Patented Dec. 28, 1920.
6 SHEETS—SHEET 3.

WITNESSES:

INVENTOR
Henry A. House, Jr.
by his attorney
J. Edward Thebaud

H. A. HOUSE, Jr.
DETACHABLE WHEEL.
APPLICATION FILED FEB. 10, 1916.

1,363,598.

Patented Dec. 28, 1920.

WITNESSES:

INVENTOR
Henry A. House, Jr.
by his attorney
J. Edward Thebaud

the hub parts.# UNITED STATES PATENT OFFICE.

HENRY A. HOUSE, JR., OF LONG HILL, CONNECTICUT, ASSIGNOR TO WIRE WHEEL CORPORATION OF AMERICA, OF NEW YORK, N. Y., A CORPORATION OF NEW YORK.

DETACHABLE WHEEL.

1,363,598.

Specification of Letters Patent.

Patented Dec. 28, 1920.

Application filed February 10, 1916. Serial No. 77,441.

*To all whom it may concern:*

Be it known that I, HENRY A. HOUSE, Jr., a citizen of the United States, residing at Long Hill, in the county of Fairfield and State of Connecticut, have invented certain new and useful Improvements in Detachable Wheels; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to detachable wheels and particularly to that class thereof which have hubs composed of inner hubs and outer hub shells.

The inner hub of this class of wheel, whether the wheel be a driving or a driven wheel, is designed to remain engaged with its axle or shaft and is held against longitudinal displacement thereon, while the outer hub shell is removably attached to and co-fits with the inner hub.

One object of the invention is to provide a hub structure of the above character with an arresting means, which is so constructed, as to permit the outer hub shell to move freely over the inner hub, when in one relation thereto, and which prevents the outer hub shell from moving off from the inner hub, when in another position, relative thereto.

Another object is to provide such a hub shell arresting means that will remain in operative relation under running or standing conditions and which can be released only upon jacking up the axle of the arrested wheel to free the hub shell from the weight of the vehicle.

Another object of my invention is to provide means for relieving the holding nut threads of direct transverse pressures, and to carry these forces elsewhere between the hub parts.

Another object of the invention is to provide a hub structure of the above character, with means for mutually supporting the hub sections at each end and wherein one of said supporting means includes devices movable longitudinally of, and outwardly radially to the hub sections, into position, for holding the same in assembled position.

A further object is to provide such anti-turning means, as can be made tight by the clamping action of the holding nut, regardless of wear of the contacting surface of said anti-turning means, in a manner to have as near a continuity of contact between said surfaces, as is practical.

A further object of the invention is to provide a hub structure of the above character, wherein the movable devices for holding the hub sections in assembled position shall, when in released position, permit the outer hub shell to pass off from the inner hub.

A still further object of the invention is to provide a hub structure of the above character, wherein the devices for securing the hub sections in assembled position are movable with respect to the hub, by an operating member which is retained on the inner hub section, when the devices are in released position.

A further object is to provide means for limiting the outward movement of the holding nut with relation to the inner hub member.

These and other objects are hereinafter referred to and will be more fully disclosed.

In the drawings, which show by way of illustration one embodiment of the invention.

The clamping nut is here shown expanded in its bearing contact with the conical end of the inner hub and the conical co-fitting bearing surface within the small end of the outer hub shell. This figure shows a modified form of annular hub shell arresting elements placed within and between the ends of the hub parts.

Figures 1, 8, 9:
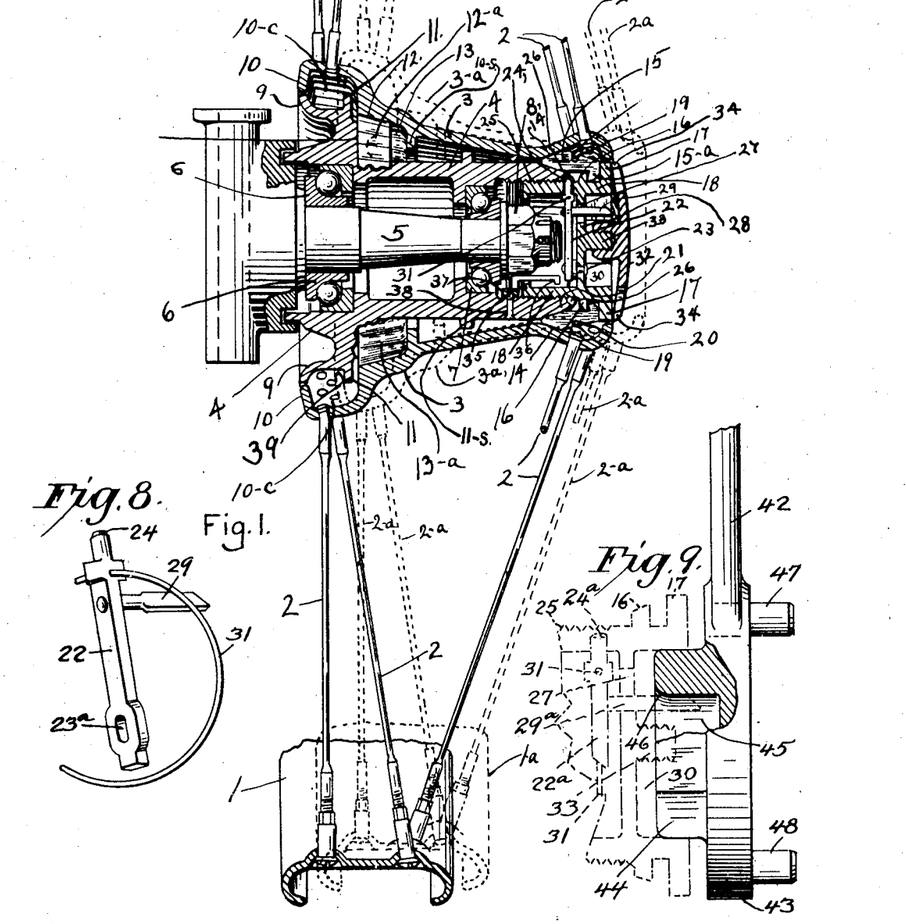
Figure 1 is a sectional elevation of a hub of a detachable wire wheel embodying my invention, also showing fragments of spokes and rim attached.
Fig. 8 is a perspective view of the bolt of the said nut locking device, showing a fragment of a spring coil attached.
Fig. 9 is a side elevation of the special wrench adapted to fit the nut and name plate.

In Fig. 1, 1 is the rim of the wheel attached by spokes 2 to the outer hub shell 3. 4 is the inner hub journaled on the stub shaft 5, of a front wheel, by means of ball bearings 6 and 7. The nut 8 holds the ball bearings, with the inner hub 4, longitudinally. Upon the large end of the inner hub 4 is shown the curved inclosing flange 9, which is fitted close to, and is concentric with, the inturned flange 10 of the outer hub shell 3 in its co-fitting position with the inner hub 4. Spaced inwardly from the curved inclosing flange 9 is the annular projection 11 on the inner hub 4. Near the center of the inner hub 4 is shown an annular projection 11$^s$, and within the hub shell 3, is shown an annular projection 10$^s$, between the flange 10 and the projection 11$^s$. The flange 10 and the projection 11 constitute one set of hub shell arresting means, the annular projections 10$^s$ and 11$^s$ constitute another set of hub shell arresting means; the relative diameters of the said projections, in each of said sets being such as to permit of said projections passing one another, when in concentric position, and to come in shouldered engagement with one another, when the hub shell 3 is moved longitudinally and eccentrically from its co-fitting position with the inner hub 4. The projections 10$^s$ and 11$^s$ are so spaced longitudinally, as to come into shouldered engagement after a failure of the flange 10 to engage or remain engaged with the projection 11, during an off-movement of the hub shell 3, from the inner hub 4. Positioned close to the projection 11, within the hub shell 3 and on the inner hub 4, is shown formed another and broader annular projection marked 12, having upon its periphery, a conically formed set of regularly spaced corrugations 12$^a$, concentrically positioned with respect to the axis of the inner hub 4, and converging toward a common point on the axis of the inner hub 4. A correspondingly formed corrugated recess 13, with corrugation 12$^a$, co-fits with the corrugated surface of the annular projection 12, and interlocked with the said projection 12 forms an anti-turning means preventing the rotation of the hub shell 3 upon the inner hub 4, and at the same time acts to center the said hub shell 3 upon the said inner hub 4 at their large ends, besides performing the function of an opposing tapered surface co-acting, longitudinally, with another member having a complemental tapered surface in the small end of the co-fitting hub parts. Within the small end of the hub shell 3 is a conical surface 14, shown engaging wedge shaped segments of a segmental clamping ring 15, engaged between the annular projections 16 and 17, of the holding means or nut 18, by the hook ends 15$^a$. A peripheral spiral spring 19, in tension, occupies an annular groove 20 on the segments of the ring 15. The said segmental ring 15 is shown also in bearing contact with the small outwardly converging conical end 21, of the inner hub 4. Positioned for reciprocal movement, radially within the nut 18 is the bolt 22, in slotted engagement at its inner end with a rivet 23, and it has its outer end 24, protruding beyond the threads 25 of the nut 18, and engages one of a series of notches 26, in the small end of the inner hub 4. Integral with the bolt 22 and extending longitudinally outward through a slot 27 in the wall 28 of the nut 18, is the arm 29, having its outer end beveled, for depressing engagement with a wrench fitted into the polygonal recess 30 of the nut 18, the bolt 22 being spring-pressed outwardly by a spring coil 31, to engage a notch 26, but released therefrom, when a suitable wrench depresses the arm 29. A name plate cap 32, threaded with the central post 33 is provided with two notches 34, 34 adapted to engage a spanner wrench. To limit the outward movement of the nut 18, I provide an inturned flange 35 on the inner end of the nut 18, adapted to engage a hook 36, having a base 37, screwed to the inner hub 4 by screws 38.

The dotted position of the outer hub shell and attached parts is that taken relative to the inner hub when the nut is removed, or lost, and the weight of the vehicle, provided with such a hub, is the engaging force. The result here represented is hereinafter described.

Figure 2:
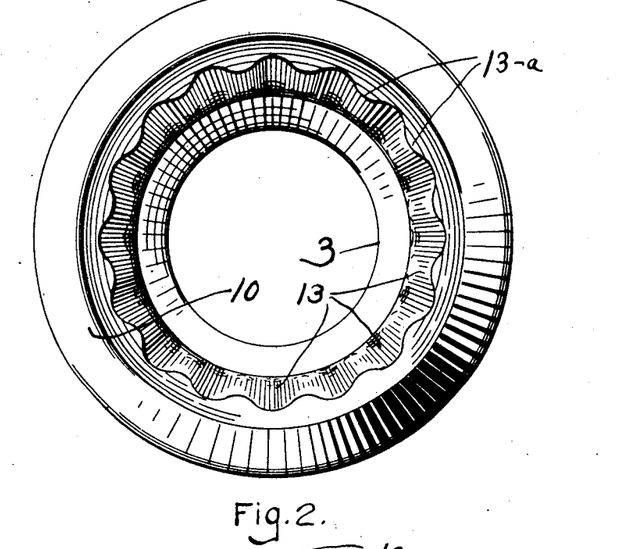
Fig. 2 is an end elevation of the outer hub shell, shown in Fig. 1, and is a view looking on the large end of said shell.

In Fig. 2, the end view of the outer hub shell 3, shows the inturned flange 10 and the corrugated conical recess 13, with its corrugations 13ª.

Figure 3:
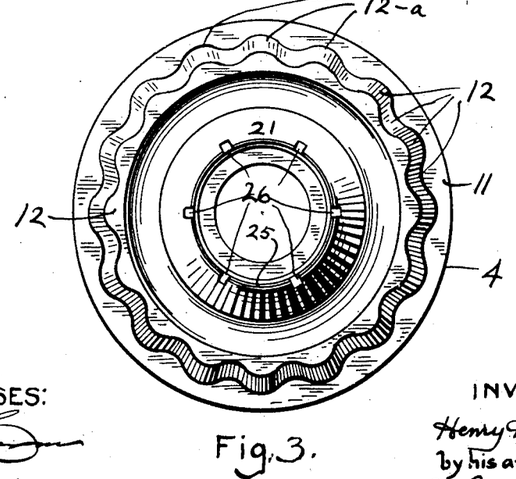
Fig. 3 is an end elevation of the inner hub, shown in Fig. 1, and is a view looking on the small end thereof.

In Fig. 3, the end view of the inner hub shows its small conical end 21, recessed at 26. 25 are the inside threads, 12 is the corrugated annular projection with corrugations 12ª. 11 is the other annular projection.

Figures 4, 5:
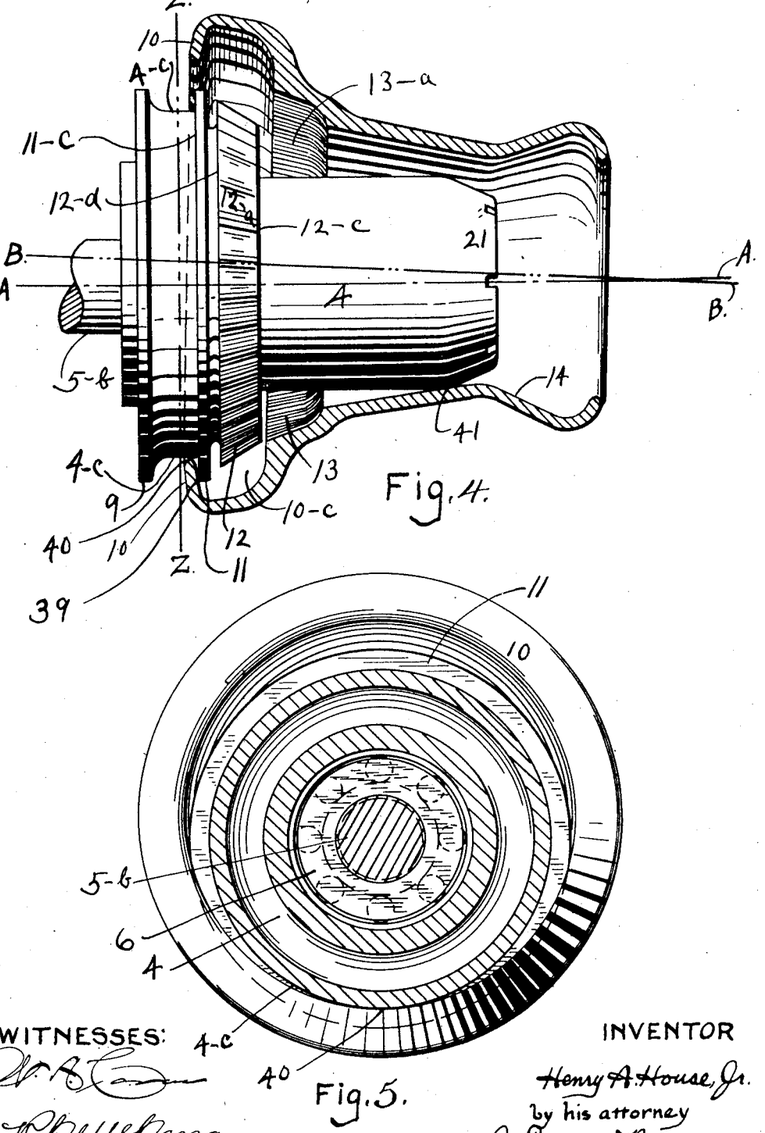
Fig. 4 is a side and sectional elevation of the hub parts above referred to, showing the said inner hub engaging the said outer hub shell in an eccentric position, with the holding nut removed, and showing the application of the hub shell arresting means.
Fig. 5 is a section taken on the line Z—Z of Fig. 4.

In Fig. 4, is shown the eccentric and caught position of the hub parts 3 and 4, whereby the inturned flange 10 occupies the recess 4ᶜ and at 39 engages the annular shoulder formed by the projection 11, contacting the neck at 40. The corrugated annular projection 12, occupies the space 10ᶜ. The small end of the inner hub 4 is shown contacting the inner wall of the outer hub shell 3, at 41. The eccentricity of the parts is further shown by the relative position of the axes of the said hub parts. A—A is the axis of the inner hub and B—B that of the outer hub shell.

In Fig. 5, 5ᵇ is a section of the axle. 6 is one of the ball bearings. 11 is an annular projection on the inner hub 4, and 10 is the inturned flange of the outer hub shell 4, here shown eccentrically enveloping the said projection 11, the inner edge of the flange 10 contacting the neck at 40.

Figures 6, 7:
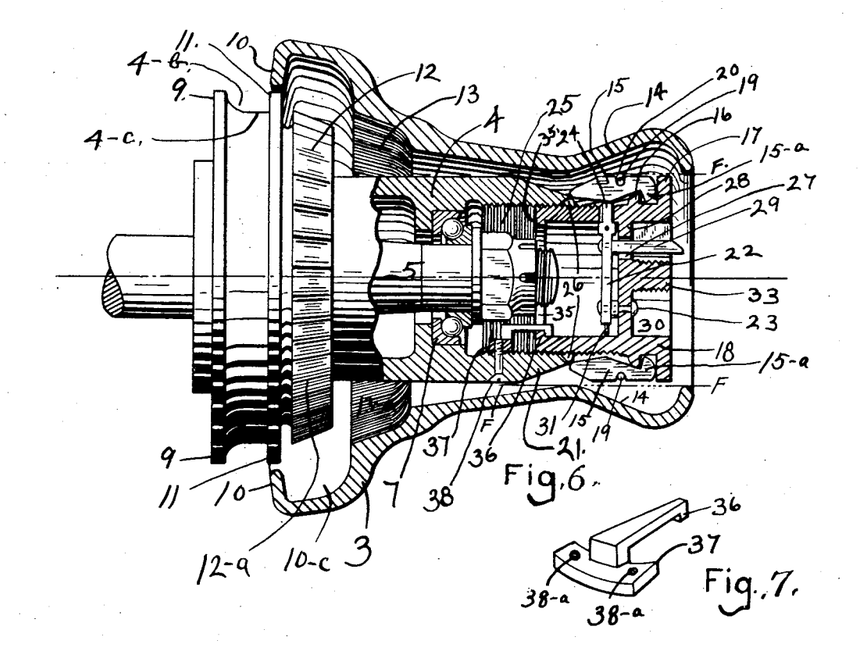
Fig. 6 is a sectional elevation of the hub shown in Fig. 1, but showing here, the holding nut partly unscrewed, allowing the outer hub shell to be withdrawn during the threaded engagement of the holding nut, with the inner hub.
Fig. 7 is a perspective view of the nut stopping device shown in Figs. 1 and 6 and used to limit the outward travel of the holding nut, to prevent its being taken off.

In Fig. 6, the nut 18 is shown partially unscrewed from the inner hub 4, and in such a position as to cause the inturned flange 35 to engage the hook 36. The segmental ring 15, in hooked engagement with the annular projection 16, is shown contracted, by the spring 19 and near the extreme end of the conical part 21, of the inner hub 4, it contacts the inner hub 4. The ring 15 is shown to be contracted by the spring 19 to come within the lines F—F, which lines are parallel and drawn tangent to the inner surface of the smallest part of the neck of the outer hub shell 3. The contracted outside diameter of ring 15, being thus less than that of the inside of the smallest part of the neck of the outer hub shell 3, permits the free taking off of the said hub shell 3, during the threaded engagement of the nut 18 with the inner hub 4.

In Fig. 7, the hook 36 extends from the curved base 37, which is provided with threaded holes 38ª, adapted to engage screws 38, shown in Figs. 1 and 8.

In Fig. 8, the connection of the spring coil 31 with the bolt 22 is clearly shown. The slot 23ª is adapted for sliding engagement with the rivet 23, shown in Figs. 1 and 6.

In Fig. 9, is shown the wrench adapted for use with the nut 18 and its cap 32. 42 is a fragment of the handle, 43 is a disk, integral with the handle. Upon the disk 43 is a hexagonal boss 44, having a circular recess 45 with a beveled edge 46. The boss 44 is adapted to enter the recess 30 in the nut 18. For taking off the cap 32, pins 47 and 48, projecting from the disk 43, form therewith a spanner wrench for engagement with notches 34 in the cap 32, shown in Figs. 1 and 15.

In this Fig. 9, fragment of the nut 18 is shown dotted, to represent the relative position of the boss 44, with reference to the nut and its locking means, when the wrench is fitted into the recess 30 of the nut 18. The arm 29ª, with the bolt 22ª, shows the depressed position taken by the bolt 22 and its arm 29, when the arm 29 engages the circular recess 45, of the wrench. The beveled edge 46 assists in depressing the arm 29, as it enters the recess 45. The end 24ª of the bolt 22ª is here shown depressed below the threads 25, allowing the free turning of the nut 18 by the wrench.

Figure 10:
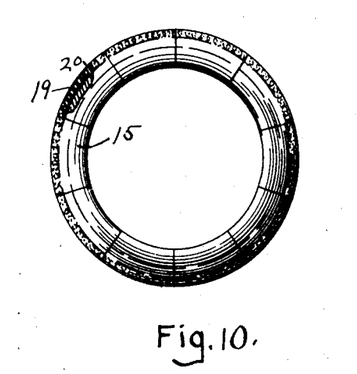
Fig. 10 is an elevation of an expansible segmental ring collapsed and drawn together. This view is taken on the wedge end of said ring.

In Fig. 10, the segmental ring 15 is shown in elevation to be closed and held by the contracting spring 19.

Figure 11:
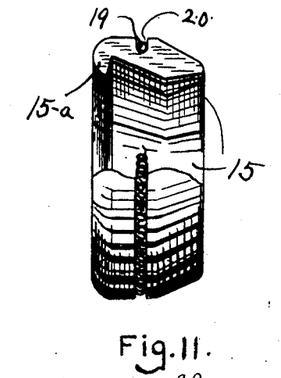
Fig. 11 is a fragmental side view of the said segmental ring collapsed.

In Fig. 11, is shown the hook ends, 15ª, of assembled elements 15ᶜ of the ring 15. The position of the spring 19 within the annular groove 20 is also shown.

Figure 12:
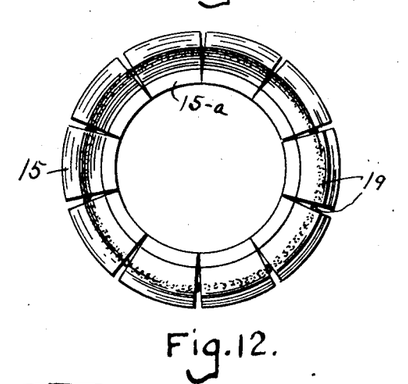
Fig. 12 is a front view of the ring shown in Figs. 10 and 11, but here shown expanded.

In Fig. 12, the expanded position of the assembled segments 15ᶜ, of the ring 15, brings the hook ends 15ª of said segments 15ᶜ into view, and also shows the peripheral spacing of the segments 15ᶜ in this expanded position.

Figure 13:
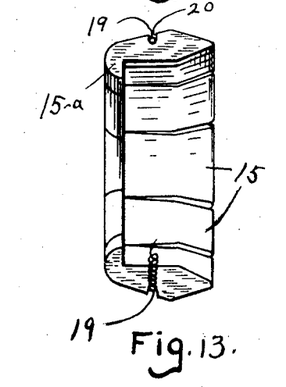
Fig. 13 is a side elevation of half the ring shown in Fig. 12.

In Fig. 13, the side elevation of half the ring 15, shown in Fig. 12, clearly shows the internal construction of the segments assembled in expanded position and surrounded by a spiral spring 19.

Figure 14:
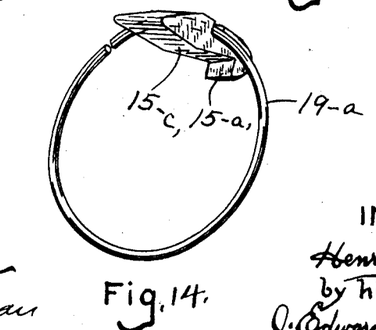
Fig. 14 is a perspective view of a single segment of said ring, shown in Fig. 1, also showing a split spring coil attached.

In Fig. 14, a split spring coil 19ª is shown as a substitute for the spiral spring 19, and occupies the groove 20 in the segment 15ᶜ. This coil 19ª is made of such a diameter, that when occupying the recess 20, of the ring 15, it will tend to hold the segments under tension whether open or closed.

Figure 15:
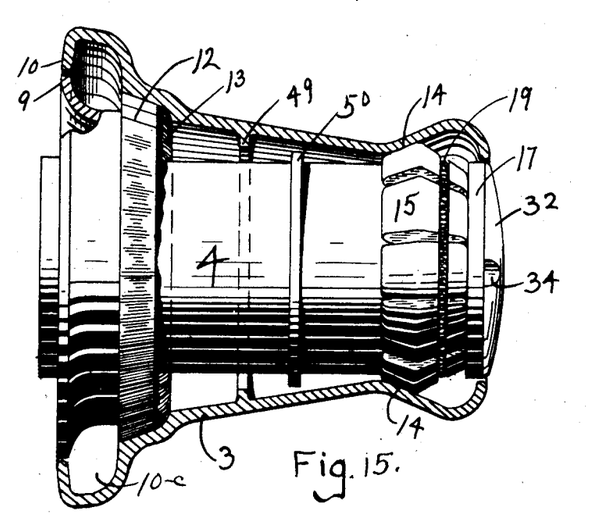
Fig. 15 is a sectional elevation showing the hub parts in their co-fitting position, together with the segmental clamping ring and the holding nut.

In Fig. 15, an annular projection 49 is shown on and within the outer hub shell 3, and an annular shoulder 50 is shown concentric on the inner hub 4. The inside diameter of the projection 49 is a little larger than the outside diameter of the shoulder 50, so as to pass concentrically over shoulder 50 when taking off the hub shell 3. In this figure the hub parts 3 and 4 are shown in their co-fitting position, and clamped longitudinally by the expanded segmental ring 15.

Figure 16:
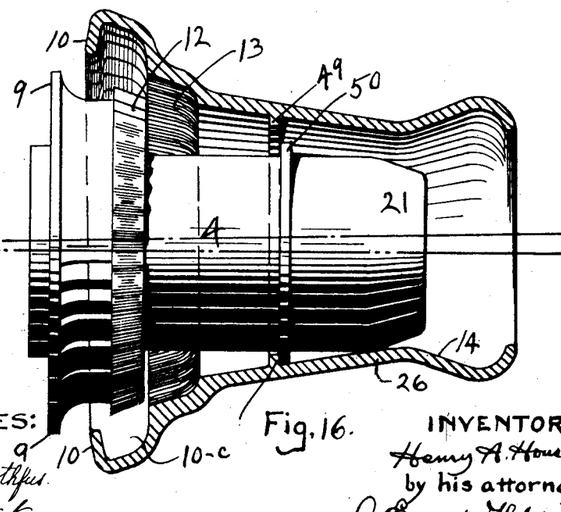
Fig. 16 is a sectional elevation showing the eccentric engagement of the inner hub with the outer hub shell by means of the said hub shell arresting elements.

In Fig. 16, is shown the eccentric engagement of the modified form of hub shell arresting means, comprising the elements 49 and 50 shown in Fig. 15.

In use, referring to Fig. 1, the inner hub 4 is first journaled on the axle 5 with the ball bearings 6 and 7 and is fixed longitudinally thereon by means of the nut 8. The outer hub shell 3, is built attached to the rim 1 by means of the spokes 2, so that the rim 1 and spokes 2 go on or off with the outer hub shell 3. As far as the detachable feature of the wheel is concerned, the inner hub 4 is allowed to remain on the axle 5 after slipping the wheel off. After journaling and fixing the inner hub 4, longitudinally, upon the axle 5, the rest of the wheel is positioned by slipping the outer hub shell 3 into co-fitting position with the inner hub 4. The outside diameter of the annular projection 11, being a trifle smaller than the inner diameter of the flange 10, the said projection 11 is adapted to pass said flange 10. The corrugations of the conical corrugated surfaces of the respective annular projection 12 and the annular recess 13, become inter-meshed, and at the same time center the large end of the outer hub shell 3 upon that of the inner hub 4. Through the intermeshed corrugations of the projection 12 and the recess 13 is transmitted the driving or rotating force; in the case of the rear wheels the inner hubs drive the wheels, while in the case of the front wheels the reverse is true and the wheels rotate the inner hubs.

The nut 18, bearing the segmental ring 15, is next threaded with the inner hub 4. A wrench is next positioned, having its boss 44 engaging the recess 30 of the nut 18, as shown in Fig. 9. During this engagement the arm 29$^a$ and the bolt 22, are depressed, so that the end 24$^a$ of the bolt is within the threads 25. As the wrench is turned to screw on the nut, the beveled ends of the segments of the ring 15, engage the conical end 21 of the inner hub 4 and sliding thereon, expand and move longitudinally inward until the ring 15 comes into engagement with the conical surface of the outer hub shell 3. A further movement of the nut 18 inward causes a drawing together of the hub parts 3 and 4. Upon withdrawing the wrench, the end 24$^a$ of the bolt 22, is free to engage one of the notches 26, being normally actuated outward by a spring 31. The bolt 22 will engage one of the notches 26 at the instant of registration therewith, and remain in this locked position, until the wrench is again applied to engage the nut 18. The cap 32 is next screwed upon the post 33, by means of a spanner wrench, having 2 pins adapted to engage the notches 34, 34. The operation of the wrench in depressing the outer end of the bolt out of engagement with any of the notches 26, is described in connection with Fig. 9.

If the nut 18 remains locked against turning from the position shown in full lines in Fig. 1, with the flange 17 crowded against the hook heads 15$^a$, of the segmental ring 15, the wheel will not come off. But if the nut 18 should be either in released position or off entirely, the outer hub shell 3 with its attached rim 1, will start to come off and assume, relative to the inner hub 4, the position indicated by the dotted lines; 3$^a$ representing the outer hub shell, 1$^a$ the rim and 2$^a$ the spokes. The inner edge of the inturned flange 10 will eccentrically contact the hub neck, shouldering against the annular projection 11 at the point 39 and part way up on each side thereof and will arrest any further longitudinal off-movement of the outer hub shell 3, on the inner hub 4.

This arrested position of the hub parts 3 and 4 is better shown in Figs. 4 and 5.

Should, for any reason, the flange 10 fail to shoulder on the annular projection 11, or slip from such shouldered engagement, then the annular projection 10$^s$, during an off movement of the hub shell 3, on the inner hub 4, will shoulder with the annular projection 11$^s$, and will form an extra arresting means to prevent the detachment of the outer hub shell 3, from the inner hub 4. It is necessary to have the outside diameter of the annular projection 11$^s$ a trifle smaller than the inner diameter of the annular projection 10$^s$ to insure the passing of the projection 10$^s$ over the projection 11$^s$, during the manual operations of fitting the hub parts together, or taking them apart.

If the large ends of the hub parts are so modified as to no longer include the hub shell arresting means, then the one set of hub shell arresting means afforded by the use of the annular projections 10$^s$ and 11$^s$ can be used.

Referring to Fig. 4, it is necessary to have the space 10$^c$ greater in diameter and longitudinal depth, than the distance between the inner face, 12$^c$, of the annular corrugated projection 12 and the outer face 11$^c$, of the annular projection 11, so that the peripheral surfaces of the projections 11 and 12 may be free to allow of the fullest eccentric shouldering of the flange 10 against the annular projection 11.

The employment of this projection 11, instead of dispensing with it and allowing the flange 10 to shoulder against the outer face 12$^d$ of the corrugated projection 12, insures the protection of the acute edge of the corrugations 12$^a$ of the projection 12, which, if allowed to contact the inner surface of the flange 10 in the act of arresting the off-movement of the outer hub shell 3, during the running of the vehicle, would become burred or otherwise damaged and be likely not to function properly with the surface of the corrugated recess 13.

Without the annular projection 11, the flange 10 could be shouldered with the projection 12, but in the running of the vehicle, the corrugated edge of the projection 12, in contact with the flange 10, might cause the projection 12 to climb out of the recess 10°, by the engagement of some of the corrugated elevations 12ª, with the inner edge of the flange 10.

Besides the rolling of the flange 10 upon the neck between flanges 9 and 11, the inner hub 4 rolls inside the outer hub shell 3, in a circular path, passing through the point of contact 41. It is important in designing the forms of the inner hub 4 and the outer hub shell 3 to have the parts so proportioned that in the arrested and rolling position of the hub parts 3 and 4, as shown in Figs. 1 and 4, the axes A—A and B—B, of the respective hub parts 4 and 3 will be as little divergent as possible to maintain the upright position of the wheel in this hub-caught position.

When the inturned flange 10 is designed to be used as one of the hub shell arresting elements, it is well to have the extra annular projection 11, besides the annular corrugated projection 12, as above explained, but in the forms of hub parts 3 and 4, shown in Figs. 15 and 16, the hub shell arresting elements are placed forward of the projection 12, toward the small ends of the said hub parts 3 and 4, and are numbered respectively 49 and 50, and the annular projection 11, shown in the other Figs. 1, 3, 4, 5 and 6, is dispensed with. The inside diameter of the annular projection 49 is a trifle greater than that of the annular projection 50, to allow the withdrawal, manually, of the hub shell 3 over and off from the inner hub 4.

The longitudinal spacing of the hub shell arresting elements 49 and 50 should be such as to bring the corrugated projection 12 freely within the annular space 10°, when the said elements 49 and 50 are in shouldered engagement, as shown in Fig. 16.

Some advantage would probably be gained by having the hub shell arresting elements 49 and 50 nearer the large end of the hub parts 3 and 4 than shown in Figs. 15 and 16, so that the said elements 49 and 50, could have broader overlapping shouldering surfaces and yet have the inside diameter of the arresting projection (similar to 49) within the hub shell 3 a trifle larger than the outside diameter of the arresting projection (similar to 50) on the inner hub 4.

Should, for any reason, the hub shell arresting elements fail to remain engaged, as shown in Fig. 16, and the hub shell 3 should continue its off-movement on the inner hub 4, the inturned flange 10 would catch onto the face 51, of the corrugated projection 12, and the flange 10, with the projection 12, would then become hub shell arresting means, giving, with 49 and 50, a plurality of sets of hub shell arresting means. In conjunction with such a double set of hub shell arresting means an extra annular projection like that numbered 11 in Figs. 1, 3, 4, 5 and 6 may be employed to protect the corrugated edge of the face 51.

The various forms of construction illustrated and described herein, may be modified and not depart from the spirit and scope of my invention. I, therefore, do not wish to be confined to the exact structure illustrated and described above.

Having described my invention, I claim—

1. In a wheel, having hub parts comprising an inner hub and an outer hub shell, adapted to co-fit together a hub shell arresting means, including two annular elements, one of said elements being positioned upon one of said hub parts and the other of said elements being positioned upon the other of said hub parts, said elements being relatively positioned and relatively proportioned to engage and lock during a longitudinal and eccentric displacement of said hub parts from their co-fitting position.

2. In a wheel, having hub parts comprising an inner hub and an outer hub shell adapted to co-fit together, a hub shell arresting means comprising an annular projection on one of said hub parts extending toward the center of its hub part and an annular shoulder on the other of said hub parts extending away from the center of its hub part, said projection and said shoulder being so proportioned and positioned, relatively, on their respective hub parts, as to engage one another during a longitudinal and eccentric displacement of said hub parts from their co-fitting position.

3. In a wheel, having hub parts comprising an inner hub and an outer hub shell, adapted to co-fit together, a hub shell arresting means comprising an annular projection on one of said hub parts and means having an annular recess upon the other of said hub parts, said projection and said recess being so proportioned and positioned relatively, that the said projection will drop into said recess, upon a longitudinal and eccentric displacement of said hub parts from their co-fitting position.

4. In a wheel, having hub parts comprising an inner hub and an outer hub shell adapted to co-fit together, two sets of hub shell arresting means, one set being positioned beyond the other and nearer to the longitudinal center of said hub parts, each set comprising an annular projection within said hub shell and an annular shoulder upon the inner hub, said projection and said shoulder forming one of said sets of said means, being so positioned, relatively, as to engage one another upon a longitudinal and eccentric displacement of said hub parts from their co-fitting position, the projection and the shoulder, forming the other of said sets of means, being so positioned, relatively, as to engage one another after a failure of the first mentioned set of means to hold the hub parts together.

5. In a wheel, having hub parts including an inner hub part and an outer hub part, removably co-fitting and attachable to one another; a hub part arresting means including two radially disposed projections, positioned relative to each other, one on each of said hub parts, to be apart during the said normal co-fitting relation of said hub parts and to come into shouldered retaining relation on the eccentric displacement of said hub parts from their normal co-fitting relation, 6. The combination of a wheel hub with a co-fitting support, means adapted to arrest and hold said hub on said support, upon a displacement of said hub from its normally co-fitting and co-axial position with said support, said means comprising an arresting member on said support, and another arresting member on the said hub, both spaced to freely pass each other during the co-axial relation of said hub with said support, and positioned to abuttingly engage during the displacement of the said hub from its normal co-fitting and co-axial relation with said support.

7. In combination, a hub and a support therefor, means for holding the hub on the support, means arresting the movement of the hub relatively to the support, operative only on the inoperativeness of the hub holding means, during a longitudinal and eccentric displacement of said hub from its normal fitting position with said support.

8. In combination, an inner hub part, an outer hub part, means disposed between the inner and outer hub parts, for holding one hub part in position in respect to the other, and means arresting the movement of the hub parts relatively to each other, operative only on the disengagement of the holding means from one of the hub parts and during the longitudinal and eccentric displacement of said hub parts from the normal relative position thereof.

9. In a wheel, the combination of an inner hub part, an outer hub part mounted thereon, means preventing relative rotation of said parts, means holding said parts in normal co-fitting position, and means on both said parts coacting whenever the holding means are inoperative to prevent accidental displacement of said parts.

10. In a wheel, the combination of an inner hub part, an outer hub part mounted thereon, means preventing relative rotation of said parts, means holding said parts in normal co-fitting position, and means on both said parts out of contact when the parts are in normal position, but brought into contact by the displacement of the parts from said position whenever the holding means are inoperative, thus acting to prevent the accidental detachment of the parts.

11. In a wheel, having two hub parts, one fitting over and removably attachable to the other, anti-turning means comprising two matching members, one member being fixed upon each of said hub parts and said members being relatively positioned to inter-engage when said hub parts are normally together, each of said members being composed of a plurality of circumferentially arranged projections, and each projection having a lateral wall, with a reversely curved surface, said projections presenting, when said members are inter-engaged, reversely curved contacting surfaces to each other, in opposition to a rotary movement of one member with respect to the other.

12. In a wheel, having two hub parts, one fitting over and removably attachable to the other, anti-turning means comprising two matching members, one member being fixed upon each of said hub parts and said members being relatively positioned to inter-engage when said hub parts are normally together, each of said members being composed of a plurality of circumferentially arranged projections, and each projection having a reversely curved lateral wall surface, said projections presenting, when said members are inter-engaged, reversely curved contacting surfaces to each other, in opposition to a rotary movement of one member with respect to the other.

13. In a wheel, having two hub parts, one fitting over and removably attachable to the other, anti-turning means comprising two matching members, one member being fixed upon each of said hub parts and said members being relatively positioned to inter-engage when said hub parts are normally together, each of said members being composed of a plurality of circumferentially arranged projections, tapering axially of the members, and each projection having a lateral wall with a reversely curved surface, said projections presenting, when said members are inter-engaged, reversely curved contacting surfaces to each other, in opposition to a rotary movement of one member with respect to the other.

14. In a wheel, having two hub parts, one fitting over and removably attachable to the other, anti-turning means comprising two matching members, one member being fixed upon each of said hub parts and said members being relatively positioned to inter-engage when said hub parts are normally together, each of said members being composed of a plurality of circumferentially arranged projections, tapering axially of the members, and each projection having a reversely curved lateral wall surface, said projections presenting, when said members are inter-engaged, reversely curved contacting surfaces to each other, in opposition to a rotary movement of one member with respect to the other.

15. In a wheel, having a hub including an inner hub member and an outer hub member detachably mounted upon and fitting said inner hub member, means for holding said members together in their normal fitting position, anti-turning means positioned upon and between said members in their normal fitting relation, and adapted to resist the turning of said members on one another, in their fitting position, said anti-turning means comprising two tapered and corrugated elements adapted to engage one another circumferentially and to center said members upon one another, and to shoulder against one another during the holding together of said members by said means, the corrugated surface of each of said elements being so formed that a section of said surface, taken in a plane perpendicular to its axis, will be a circumferentially sinuous line.

16. In a detachable wheel the combination of an inner hub, a hub shell detachably mounted thereon, an external flange on said inner hub having an inclined outer surface so formed that a section taken perpendicular to the axis of the hub will be a periodic curve, and a similarly formed surface upon said hub shell, said surfaces intermeshing when the shell is mounted upon the hub to prevent relative rotation of the shell and hub and transmit motion from one to the other.

Buffalo, N. Y., February 8, 1916.

HENRY A. HOUSE, Jr.

Witnesses:
O. S. Laycock,
M. K. Barton.